United States Patent [19]
Ianello et al.

[11] Patent Number: 5,956,936
[45] Date of Patent: Sep. 28, 1999

[54] ELONGATED CHAIN LINK

[75] Inventors: Garrick J. Ianello, Portland; Bruce C. Johnson, Gresham, both of Oreg.

[73] Assignee: Columbia Steel Casting Co., Inc., Portland, Oreg.

[21] Appl. No.: 09/229,479

[22] Filed: Jan. 13, 1999

[51] Int. Cl.⁶ .................................................. F16G 13/12
[52] U.S. Cl. ............................ 59/90; 59/3; 59/84; 59/93
[58] Field of Search ............................ 59/1, 3, 35.1, 78, 59/83, 84, 90, 93

[56] References Cited

U.S. PATENT DOCUMENTS

| | | |
|---|---|---|
| D. 239,731 | 4/1976 | Kitson . |
| 645,202 | 3/1900 | Carter . |
| 1,373,172 | 3/1921 | Daubenspeck .............................. 59/90 |
| 2,507,025 | 5/1950 | Lemmon . |
| 3,077,178 | 2/1963 | Gordon ...................................... 59/84 |
| 3,796,246 | 3/1974 | Walenta ...................................... 59/84 |
| 4,110,971 | 9/1978 | Bruce . |
| 4,497,169 | 2/1985 | Millington . |

*Primary Examiner*—David Jones
*Attorney, Agent, or Firm*—Klarquist Sparkman Campbell Leigh & Whinston, LLP

[57] ABSTRACT

An elongated chain link comprising a pair of opposing U-shaped end portions connected by a pair of parallel leg portions. The leg portions are connected to each other by a pair of crosswise tie-bars situated toward the end portions approximately equally offset from the cross-axial centerline of the link. Additional crosswise tie-bars may be added to prevent the legs of the link from collapsing together when a large side-load is applied to the link. The leg portions are substantially square in cross section, while the end portions comprise an inner portion having an arcuate inner surface and an outer portion being substantially rectangular in cross-section. The chain link is preferably made of a high-strength cast alloy steel and is especially well-suited for use in dragline drag and hoist chains.

9 Claims, 5 Drawing Sheets

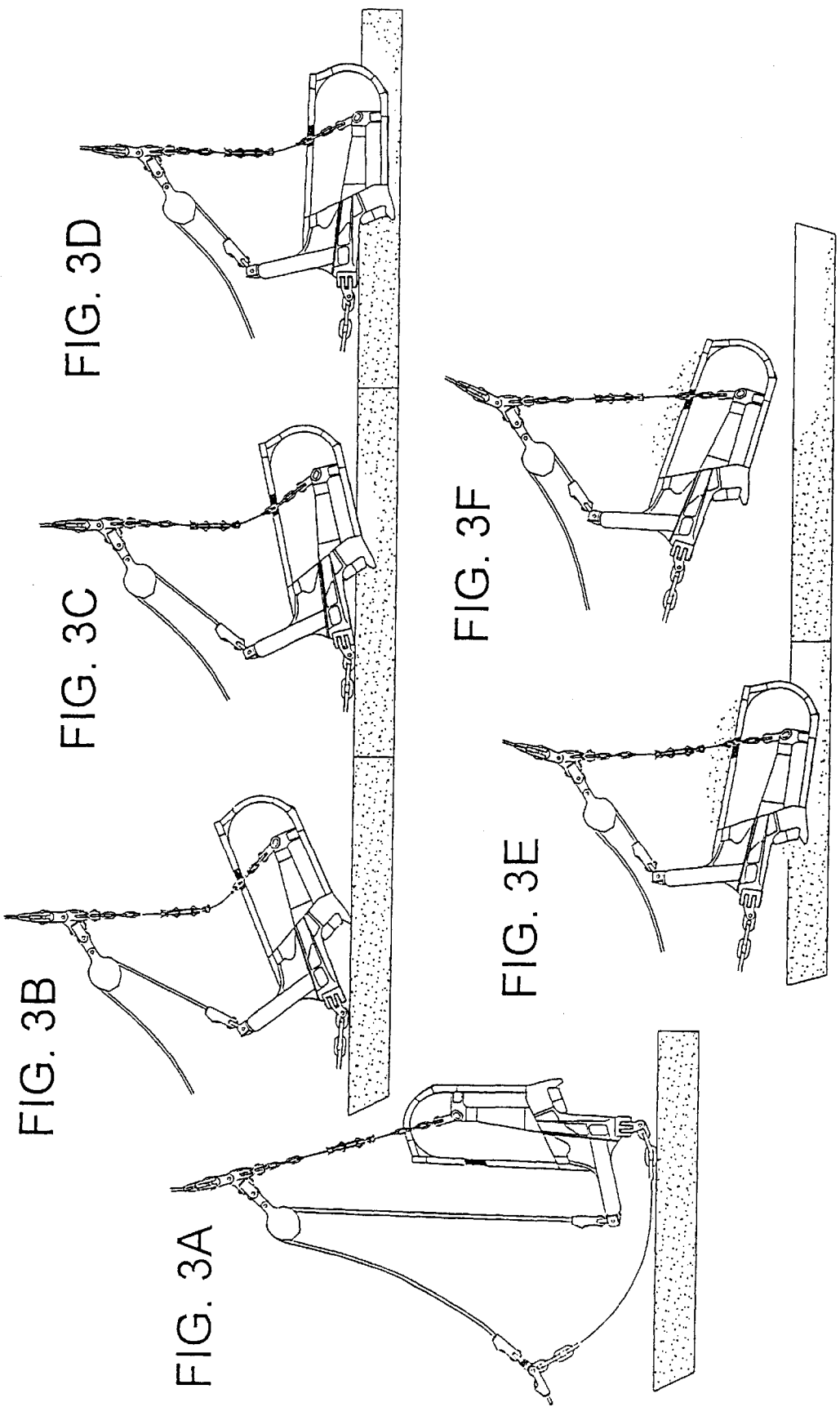

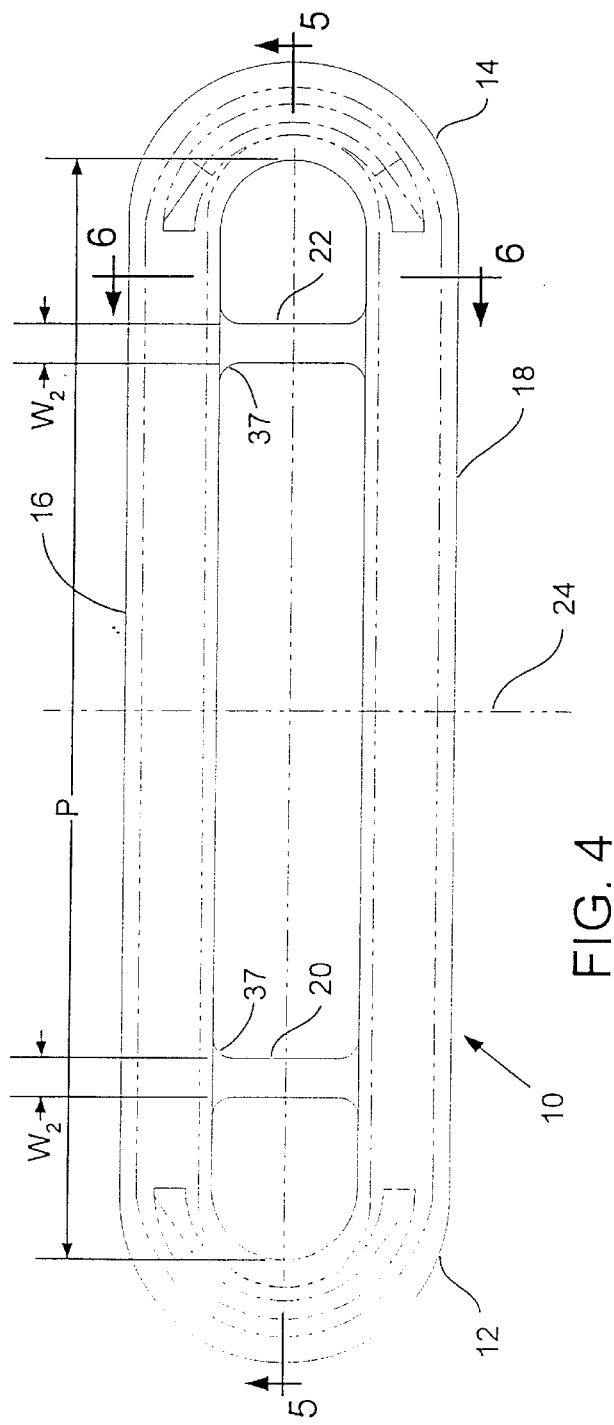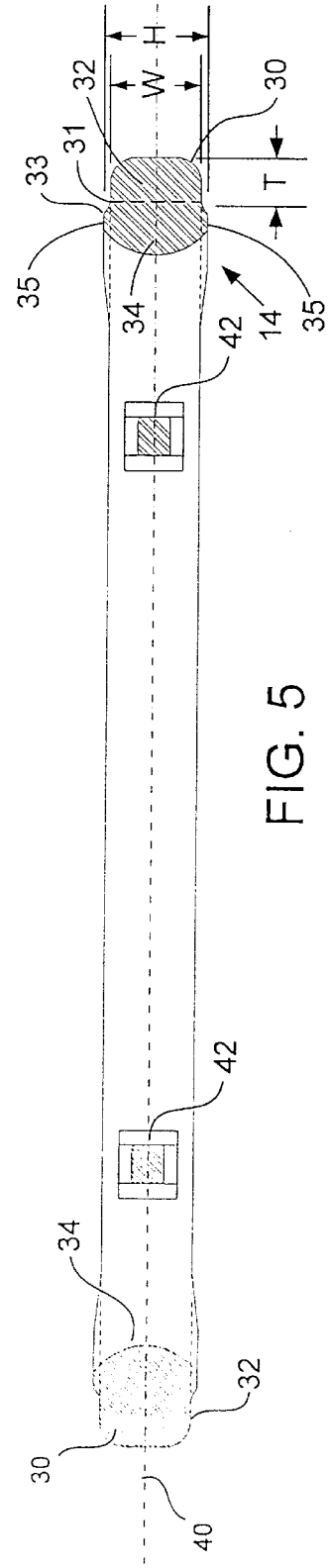

ELONGATED CHAIN LINK

FIELD OF THE INVENTION

The present invention pertains to chains and chain links in general, and dragline chains in particular.

BACKGROUND OF THE INVENTION

Draglines are commonly used for removing large volumes of material, such as dirt, loosened ore, etc., and are particularly well-suited for removing overburden in large strip mining operations where tens of millions of yards of material must be removed in an efficient manner. A typical dragline is shown in FIG. 1. Draglines work by dragging a large bucket along the surface to scoop up material, hence the name. Draglines provide several advantageous features over other earthmoving equipment, including a long reach for both digging and dumping, the ability to dig below their tracks (or base), and a high cycle speed.

Draglines are available in a variety of different sizes, with the largest draglines being among the most massive mobile equipment every produced. For example, the dragline shown in FIG. 1 is a Marion 8750 series dragline that has a 360 foot boom, and is equipped with a 135 cubic yard bucket. The largest dragline ever built has a bucket capacity of 220 cubic yards and weighs nearly 14,000 tons.

Referring to FIG. 1, the major components of a dragline include a powerplant 100, a boom 102, a hoist cable 104, a bucket 106, hoist chains 108, drag chains 110, dump cables 112, and drag cables 114. The machine powerplant 100 is mounted on a rotary base 115, allowing the boom to swing in the horizontal plane. Smaller draglines typically employ sets of tracks for moving the machine, while larger draglines use a "walking" mechanism. These larger machines are referred to as walking draglines. The hoist cable 104 can be retracted or extended by means of a hoist drum (not shown) that is located in the powerplant. Likewise, the drag cable 114 can be retracted and extended by means of a drag drum (not shown) located in the powerplant.

As shown in FIG. 2, the drag cable 114 is connected to pair of drag sockets 116. The drag sockets 116 are connected through drag devises 118 to the drag chains 110. The drag chains 110 are connected to the bucket 106 at hitch devises 120. The drag sockets 116 are also respectively connected to a pair of dump sockets 122 at dump devises 124. A second pair of dump sockets 126 is connected to the front of the bucket 106 at anchor links 128. The dump sockets 122 and 126 are commonly connected to a respective pair of dump cables 112 which ride on dump sheaves 130. A pair of upper hoist cables 132 are commonly connected to the bottom pickup link 134 at their top ends, and opposing sides of a spreader 136 at their bottom ends. A pair of lower hoist cables 138 are connected to the spreader 136 at their top ends, and are connected at their bottom ends to the bucket 106 at trunnions 139. The pickup link 134 is connected to a hoist equalizer 140, which in turn is connected to hoist sockets 142. The hoist sockets 142 are connected to the hoist cables 104. The hoist equalizer 140 is also connected to a pickup link 144, which is connected to a dump sheeve shackle assembly 146 that holds the dump sheaves 130.

The loads on the hoist and drag chain links are massive. It is common for the largest draglines to employ hoist and drag cables that are 5 inches in diameter. These cables are made out of very-high-strength steels, and support suspended loads exceeding 750,000 lbs. The loads placed on the hoist chains and drag chains are equally impressive. These loads dictate the use of specialized chain links made from ultra-high-strength alloyed steels. In addition, these chains and chain links must be designed to endure a tremendous amount of wear, as discussed below.

A typical dragline digging cycle is shown in FIGS. 3A–3F. As shown in FIG. 3A, the digging cycle begins by lowering the bucket into the mine pit with both the hoist cable and the drag cable nearly taut until the bucket contacts the pit surface. At this point the hoist cable is slightly slackened and the drag cable is pulled toward the tractor (FIGS. 3B–3E). This results in the bucket teeth digging in and cutting a slice of material that piles inside the bucket. The depth and angle of the cut may be controlled by varying the hoist cable length as the drag cable is pulled.

As a result of the digging operation, the drag chains are continuously dragged across and/or through the material being removed. This is particularly true for the chain links that are located closest to the bucket. In a typical dragline the size of the drag chain links are even more substantial than the size of either the hoist cable or the drag cable. This is due in part to the fact that the drag chain links must have sufficient surface areas to endure the constant wear that occurs during dragline digging operations. The ends of the chain links are also continuously worn as the chains are flexed during digging and dumpling operations. Dragline chains eventually become so worn that they fail and must be replaced, which is very costly in terms of both material and machine downtime. Large draglines are commonly operated 24 hours a day, seven days a week, and downtime cost for such machines may exceed $500 per minute.

The chain links are sized so that they will be able to support their loads after significant wear. The nominal size of the chain links (generally a cross-section width or thickness) is primarily a function of the strength of the chain link material, the load that must be carried, and empirical wear data. As a result of the wear considerations, conventional drag and hoist chains are sized to be much larger (and heavier) than would be necessary to carry their nominal loads.

The amount of material a dragline can remove (the payload) is primarily limited by the size of its bucket and the type of material the dragline is working in. The size of the bucket is limited by the maximum allowable suspended load rating of the machine, the suspended load including the weight of a loaded bucket and the weight of the various other components that are supported by the hoist cable (the hoist chains, drag chains, sockets, clevises, etc.—hereinafter the bucket support components). The suspended load rating is primarily a function of the strength of the boom, the torque capacity of the hoist drum and drag drum, and the overall horsepower of the machine.

The maximum suspended load rating for a machine is calculated by engineering analysis of the boom structure, using a safety factor that in part is determined by prior experience. It is generally desired to maximize the payload for a given machine, and this usually leads to using the machine at near its maximum suspended load rating. However, operating at near the maximum rating usually can only be performed on newer machines, because the strength of a boom is reduced over the lifetime of the dragline. This is due to the constant fatigue loading that is applied to the boom during machine operation. The fatigue loading of the boom can be reduced by reducing the suspended load. Unfortunately, a reduction in the suspended load usually means a reduction in payload.

It would therefore be advantageous to be able to (1) maximize the payload without reducing the suspended load and/or (2) reduce the suspended load without reducing the payload capacity. The first object can be accomplished by increasing the size of the bucket in conjunction with a decrease the weight of the bucket support components. The second object can be accomplished by simply reducing the weight of the bucket support components while maintaining the bucket size.

Both of these objects can be obtained by reducing the weight of the drag chains and/or hoist chains. The drag and hoist chains represent a significant portion of the total weight of the bucket support components. For instance, on a large machine individual drag chain links may weigh more than 300 lbs., and an entire drag chain may weigh upwards of 5 tons. In general, the weight of a loaded bucket can be increased by an amount equal to the reduction in drag chain and/or hoist chain weight. Alternatively, a reduction in the weight of the drag and/or hoist chains without a change in the size of the bucket will yield a commensurate decrease in the suspended load.

It is thus desired to reduce the weight of the drag and/or hoist chains. However, reduction of the weight of these chains has previously been limited because of the aforementioned wear considerations. It is therefore desired to produce reduced-weight drag and hoist chains that have similar performance characteristics when compared with heavier conventional chains.

SUMMARY OF THE INVENTION

The invention is an elongated chain link that can be used to form drag and/or hoist chains with improved strength-to-weight ratios when compared with conventional chains, without sacrificing longevity. The elongated chain link is especially well-suited for high-loading, high-wear uses such as in dragline chains.

The elongated chain link comprises a pair of opposing U-shaped end portions that are connected by a pair of substantially parallel leg portions. The leg portions are connected to each other by a pair of crosswise tie-bars that are situated toward the end portions, approximately equally offset from the cross-axial centerline of the chain link. Optionally, one or more additional crosswise tie-bars may be added to provide addition strength to prevent the leg portions of the link from collapsing upon one another if a large side-load is applied to the link.

The leg portions preferably are substantially square in cross-section with radiused corners, while the end portions comprise an inner portion having an arcuate inner surface over a substantial portion of the end portion length, and an outer portion that is rectangular in shape with radiused corners to substantially match the outer portion of the leg portion cross-section. The arcuate inner surface extends slightly above and below the nominal thickness of the outer portion cross-section The elongated chain link is preferably made of a high-strength cast alloy steel. A chain can be fabricated by casting a first set of links and then integrally casting a second set of links wherein each second-set link is situated between a pair of first-set links and the links are oriented in an alternating fashion. Subsequent to the casting process, the chain links are preferably heat-treated to increase the hardness of their outer surfaces and tensile strength. Additional surface hardening processes may also be employed to increase the life of the chain.

BRIEF DESCRIPTION OF THE DRAWINGS

FIGS. 3A–3F show the configurations of the bucket and support components during a dragline digging cycle;

FIG. 4 is a plan view of an exemplary chain link of the invention;

FIG. 5 is a cross-sectional view of the chain link of FIG. 4 taken along line 5—5 of FIG. 4;

DETAILED DESCRIPTION

Figure 1:
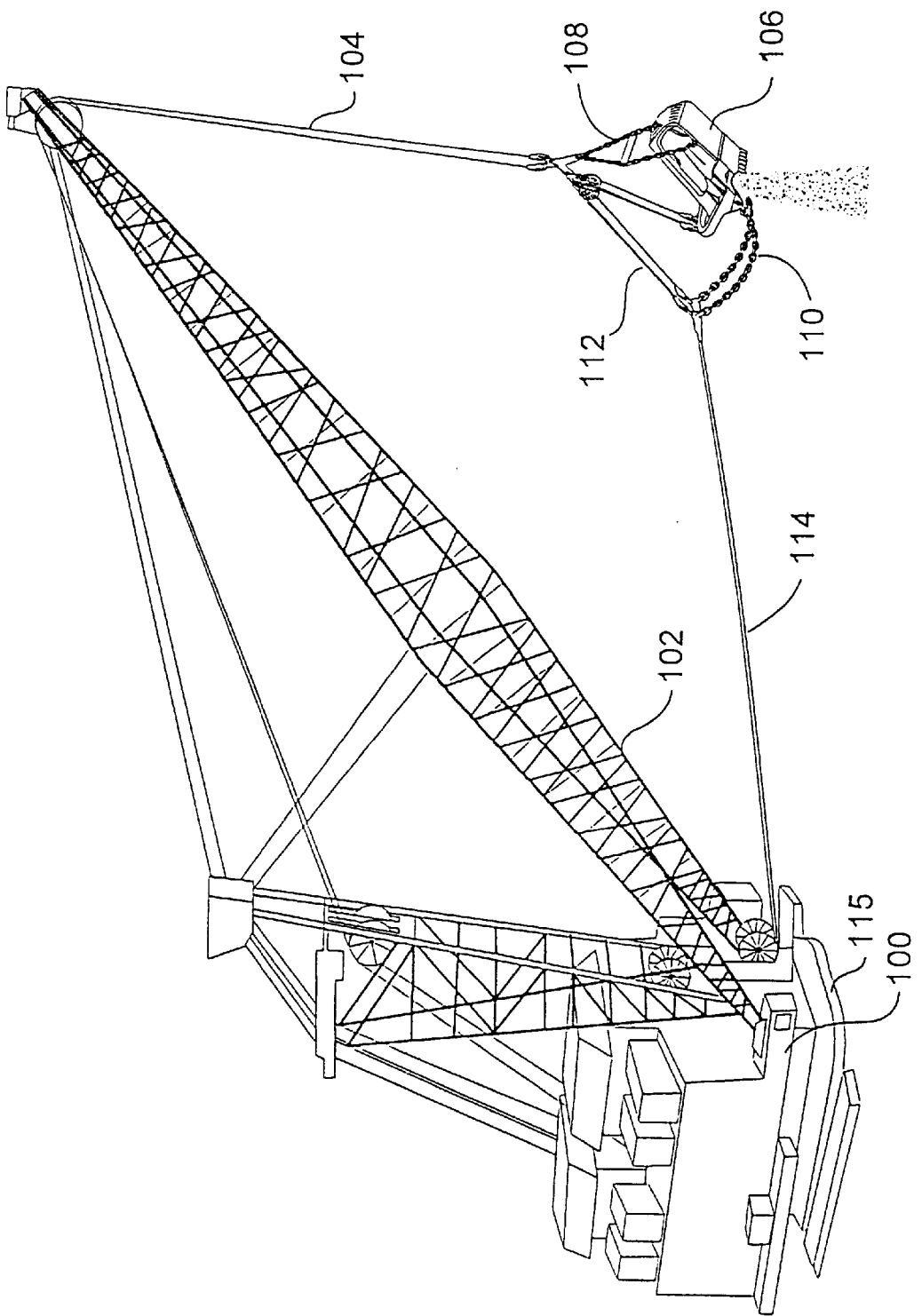
FIG. 1 shows a typical large dragline and its major components.
Figure 2:
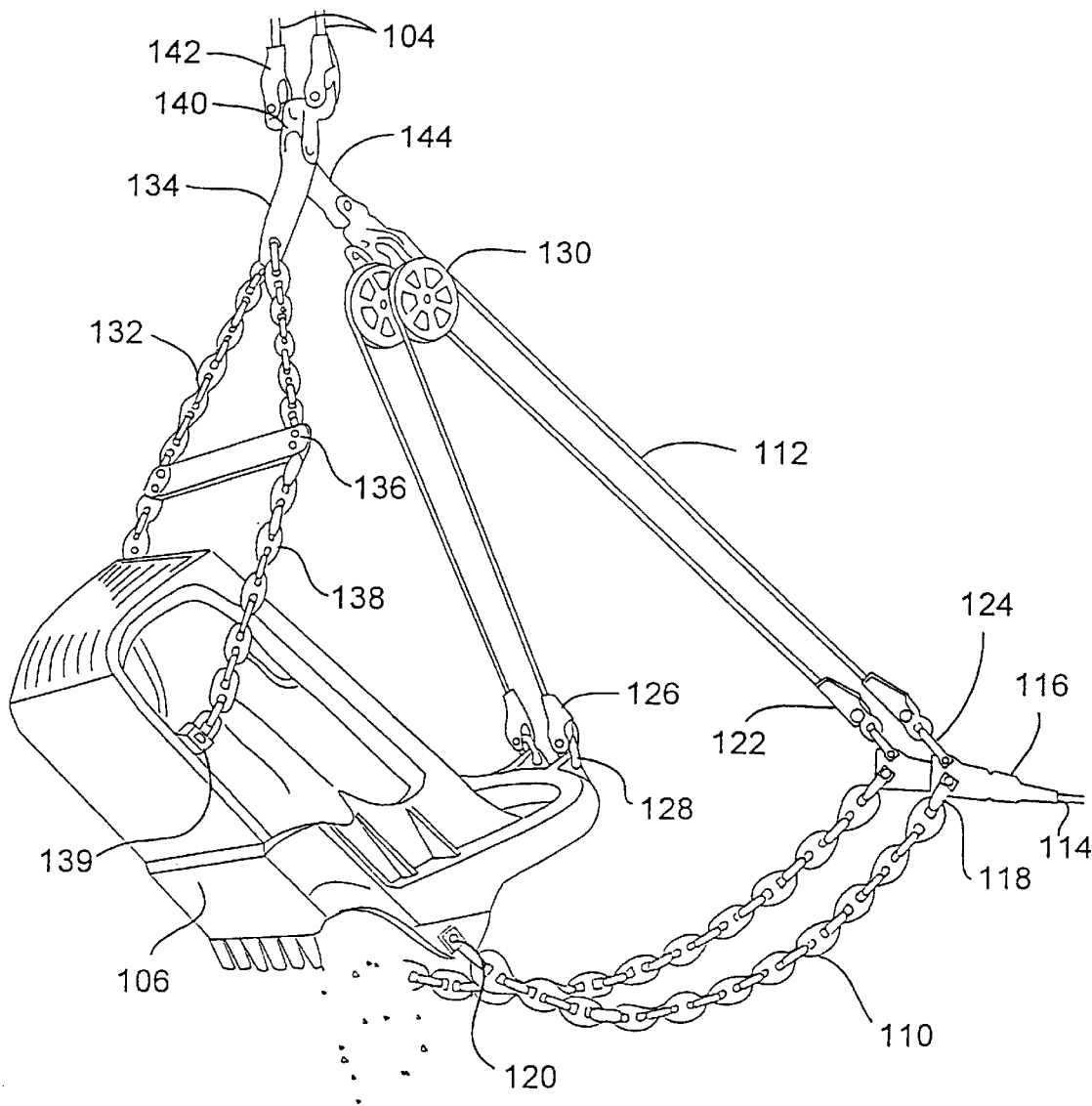
FIG. 2 shows a detailed view of the bucket area of the FIG. 1 dragline.
Figure 6:
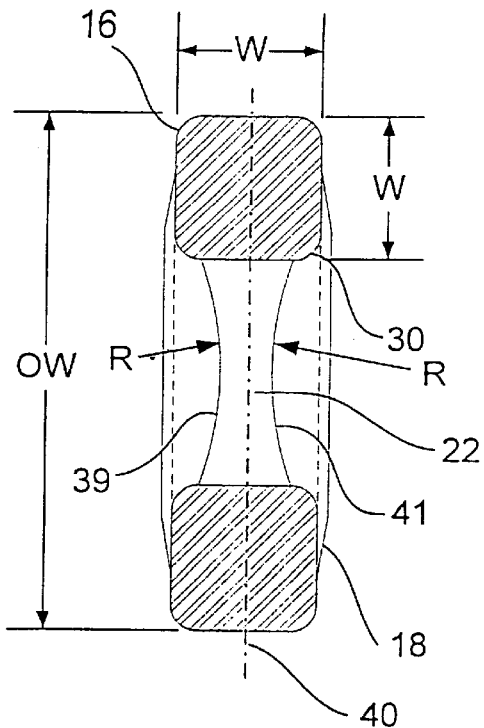
FIG. 6 is an enlarged cross-sectional view of the chain link of FIG. 4 taken along line 6—6 of FIG. 4.

The elongated chain link 10 of the present invention shown in FIGS. 4–6 comprises a pair of U-shaped end portions 12, 14 connected by a pair of substantially parallel leg portions 16, 18. The leg portions 16, 18 are connected to each other by two crosswise tie-bars 20, 22. The tie-bars 20 and 22 are approximately equally offset from the cross-axial centerline 24 of link 10 and situated toward the end portions 12, 14. The tie-bars 20, 22 are used to prevent chain links from collapsing upon one another (thereby slackening the chain) when the forces applied at the ends of the chain are reduced.

The leg portions 16, 18 are substantially the same in profile along their entire lengths and are substantially square with radiused corners 30, as shown in FIG. 6. In the case of link 10, the leg portions 16, 18 have a nominal square cross-section width W, which in a typical chain link may be 3.5 inches and have a radius of about ⅝ inches at their corners 30. The overall width OW of link 10 may be approximately 12.5 inches.

Referring to FIG. 5, the end portions 12, 14 each comprise an outer, rectangular portion 32 having substantially the same width W as the leg portions 16, 18 and a thickness T that is about one-half the width W. The corners 30 of the portion 32 are preferably rounded as illustrated. The inner portion 34 of each end portion is arcuate in profile as shown in FIG. 5. For example, in a link having a width W of 3.5 inches, the radius of the arcuate surface of the inner portions may be 2.5 inches. The inner portions 34 are formed so as to protrude slightly above and below the top and bottom surfaces of the outer portions 32, as shown in FIG. 5, and the outermost top and bottom surfaces 35 of the inner portions are flattened so as to provide an overall height H in the exemplary link of 4 inches. The purpose of this arcuate profile and thickening is to increase the bite (contact) area between two connected links, thereby increasing the useable life of the links. The inner portion 34 and outer portion 32 are blended together by means of curved surfaces 31 and 33. The outer surfaces 35 are also blended to mate with the surfaces of the leg portions 16, 18, as may be seen in FIG. 5.

As best seen in FIG. 4, the end portions 32 are bisected by a plane 40 defined by the longitudinal axes of the leg portions 16, 18. The inner portions 34 are likewise bisected by the plane 40, the inner surfaces portions 55 each extending from the plane 40 by about 0.75 inch more than the outer portions 32.

Referring to FIGS. 4–6, the tie-bars 20, 22 are similarly shaped and have a substantially uniform width $W_2$ as indicated when viewed in plan, (see FIG. 4) blending into the leg portions 16, 18, as indicated at 37. In this exemplary link, the width $W_2$ is 1.5 inches. As shown in FIG. 6, the top and bottom surfaces 39, 41, respectively of the tie-bars, are arcuate. In the exemplary link the radius R is 0.8 inches, the minimum thickness of a tie-bar being about 1.25 inches, the maximum being about 2.25 inches.

The pitch P of the chain link 10 is preferably at least 10 times greater than the nominal width W of the legs 16, 18. For example, the exemplary chain link 10 has a nominal leg width of 3.5 inches and a pitch P of 42 inches so as to provide a pitch-to-leg-width ratio of 42:3.5=12. A greater pitch-to-leg-width ratio may be utilized depending upon the environment in which the chain is to be operated.

Figure 7:
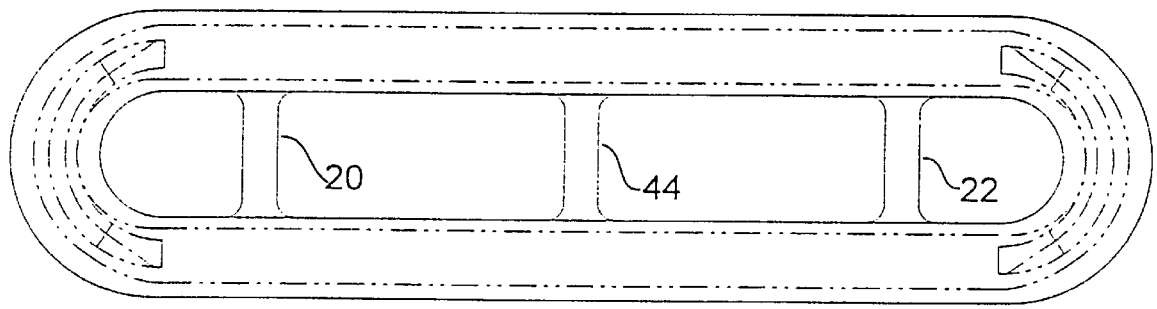
FIG. 7 illustrates an alternate embodiment of a chain link constructed in accordance with the invention.
Figure 8:
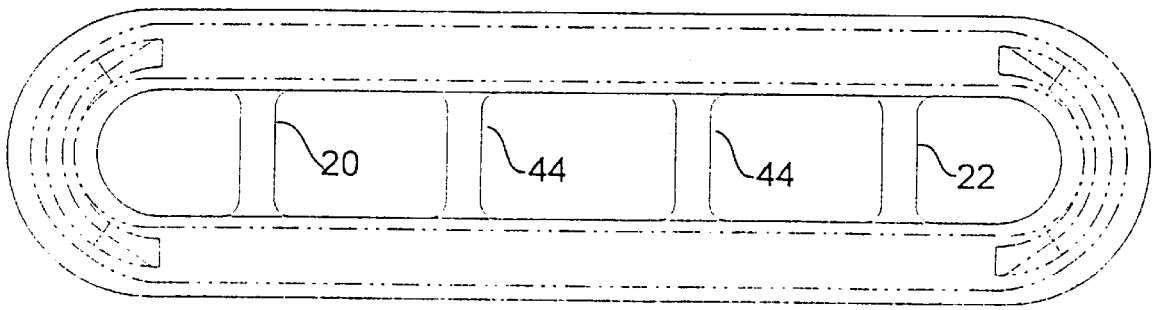
FIG. 8 illustrates still another alternate embodiment of a chain link constructed in accordance with the invention.

As shown in FIGS. 7 and 8, the link 10 may optionally have one or more anti-collapse tie-bars 44 located toward the center of the link. These anti-collapse tie-bars are used to prevent the leg portions 16, 18 from collapsing together in the event that a chain link strikes hard against the dragline bucket or is crushed against the sidewall or bottom of the bucket.

The link 10 is suitable for use in both drag chains and hoist chains. Links made in accordance with the invention provide wear surfaces that are similar in size to conventional chains, while providing a reduction in the overall weight of a chain due to the increased pitch length. For instance, a prototype chain comprising multiple links 10 has been recently manufactured. The prototype chain has a chain link pitch that is three times the pitch of conventional dragline chain links of similar nominal size, while providing a 27% weight reduction.

Conventional drag and hoist chains are substantially similar to ship anchor chains, which require a shortened pitch so that the chain is flexible enough to be coiled around windlasses and on reels. Conversely, the majority of the length of a drag or hoist chain does not require such flexibility. Therefore, a drag or hoist chain that comprises the elongated chain links of the invention will not suffer a performance penalty due to its increased chain-link pitch and decreased flexibility. However, it may be necessary to use one or more conventional-pitch chain links at the hitch clevis and/or drag clevis ends of the drag chains to provide increased flexibility at these points, depending on the particular characteristics of a given dragline configuration.

The elongated chain links are preferably formed from a high-strength cast alloy steel (such as H-39 or H-55). Such chain links typically have tensile strengths in excess of 175,000 psi. For example, a chain link of a nominal thickness of 2.5 inches made from H-39 alloy steel may have a tensile strength of 210,000 psi. Subsequent to the casting process, the chain links are preferably heat-treated to increase the surface hardness in high wear areas, such as the bite area and the outer surface areas of the link. The chain may also be made using a bi-metallic composition process such as Columbia Steel's "XTEND PROCESS"® on surfaces that are subject to high wear. A chain comprising multiple elongated chain links can be fabricated by casting a first set of links and then integrally casting a second set of links so that each second-set link is situated between a pair of first-set links and the links are oriented in an alternating fashion.

Having described the principles of the invention with reference to a detailed embodiment, it should be apparent that the invention can be modified in arrangement and detail without departing from such principles. For example, larger and smaller versions of the chain link can be made by changing the nominal width of the leg portions of the chain with a corresponding change in the pitch length so as to maintain a pitch-to-leg-width ratio of at least 10:1. The details of the crosswise tie-bars may also be modified to suit a particular application. Many other such variations will be apparent to those skilled in the art.

In view of the many embodiments to which the principles of the invention can be applied, it should be understood that the detailed embodiment is exemplary only and should not be taken as limiting the scope of the invention. We claim as our invention all such embodiments as may fall within the scope and spirit of the following claims, and equivalents thereto.

We claim:

1. An elongated chain link comprising a pair of opposing U-shaped end portions connected by a pair of substantially parallel leg portions of equal predetermined length and being of predetermined cross-sectional area, said leg portions each having a lengthwise midpoint, and a pair of crosswise tie-bars extending between said leg portions approximately equally offset from said leg portion midpoints and toward each of said chain link end portions.

2. The elongated chain link of claim 1, wherein each said leg portion is substantially square in cross section with a predetermined thickness, said chain link having a pitch, said pitch being at least ten times greater than said leg portion thickness.

3. The elongated chain link of claim 2, wherein said leg portions have rounded corners.

4. The elongated chain link of claim 1, wherein each of said leg portions has a longitudinal axis and said leg axes are parallel, each of said end portions has an outer portion of rectangular cross-section of predetermined thickness bisected by a plane defined by said axis, said end portions having an inner portion bisected by said plane having an arcuate inner surface extending above and below said plane by a predetermined amount greater than said outer portion.

5. The elongated chain of claim 1 further comprising at least a third crosswise tie-bar located substantially at said midpoints of said leg portions.

6. A dragline chain comprising a plurality of elongated chain links each comprising a pair of opposing U-shaped end portions connected by a pair of substantially parallel leg portions of equal predetermined length and being of predetermined cross-sectional area, said leg portions each having a lengthwise midpoint, and a pair of crosswise tie-bars extending between said leg portions approximately equally offset from said leg portion midpoints and toward each of said chain link end portions.

7. The dragline chain of claim 6 made of high-strength alloy steel with a tensile strength greater than 175,000 psi.

8. A dragline chain comprising a plurality of elongated chain links, each chain link comprising a pair of opposing U-shaped end portions having inner and outer portions, said end portions being connected by a pair of substantially parallel leg portions having a predetermined length and a substantially square cross-section, said leg portions being connected to each other by a first crosswise tie-bar situated substantially midway between the opposite ends of said leg portions, and second and third crosswise tie-bars substantially equally offset from said first crosswise tie-bar and located adjacent said chain link end portions, said end portion inner portions having an arcuate inner surface, said end portion outer portion being substantially rectangular in cross-section.

9. The dragline chain of claim 8 made of a high-strength alloy steel with a yield strength greater than 175,000 psi.

\* \* \* \* \*

UNITED STATES PATENT AND TRADEMARK OFFICE
CERTIFICATE OF CORRECTION

PATENT NO. : 5,956,936
DATED : September 28, 1999
INVENTOR(S) : Garrick J. Ianello and Bruce C. Johnson It is certified that error appears in the above-indentified patent and that said Letters Patent is hereby corrected as shown below:

Column 1/Line 42, delete "devises" insert--clevises--.

Column 1/Line 43, delete "devises" insert--clevises--.

Column 1/Line 45, delete "devises" insert--clevises--.

Signed and Sealed this

Twentieth Day of March, 2001

Attest:

NICHOLAS P. GODICI

*Attesting Officer*     *Acting Director of the United States Patent and Trademark Office*